United States Patent
Sakata (10) Patent No.: US 9,654,655 B2
(45) Date of Patent: May 16, 2017

(54) IMAGE READING DEVICE AND IMAGE FORMING APPARATUS WITH BLANK PAGE SKIPPING FUNCTION

(71) Applicant: KYOCERA Document Solutions Inc., Osaka-shi, Osaka (JP)

(72) Inventor: Hiromi Sakata, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/051,584

(22) Filed: Feb. 23, 2016

(65) Prior Publication Data

US 2016/0255222 A1  Sep. 1, 2016

(30) Foreign Application Priority Data

Feb. 26, 2015  (JP) .................................. 2015-036801

(51) Int. Cl.
 *G06F 3/12*  (2006.01)
 *H04N 1/00*  (2006.01)
 *G06K 9/00*  (2006.01)

(52) U.S. Cl.
 CPC ..... *H04N 1/00482* (2013.01); *G06K 9/00456* (2013.01); *H04N 1/00411* (2013.01); *H04N 1/00514* (2013.01); *H04N 1/00803* (2013.01)

(58) Field of Classification Search
 CPC combination set(s) only.
 See application file for complete search history.

(56) References Cited

U.S. PATENT DOCUMENTS

2012/0147406 A1\* 6/2012 Yamaneki .......... H04N 1/00217
 358/1.13
2012/0154853 A1\* 6/2012 Otake ...................... H04N 1/41
 358/1.15

FOREIGN PATENT DOCUMENTS

| JP | 2006261889 A | 9/2006 |
|----|--------------|--------|
| JP | 2010258698 A | 11/2010 |
| JP | 2012080231 A | 4/2012 |
| JP | 2015005955 A | 1/2015 |
| JP | 2015008427 A | 1/2015 |

\* cited by examiner

*Primary Examiner* — Henok A Shiferaw
(74) *Attorney, Agent, or Firm* — Alleman Hall Creasman & Tuttle LLP (57) ABSTRACT

An image reading device includes an image scanning portion, a page classification portion, a preview output portion, a page classification correction portion, and a file replacement portion. The preview output portion generates a primary image data file including: a plurality of pieces of page image data; and page classification information that allows the non-blank page and the blank page to be separated from each other, and displays, on a display portion, an image of the non-blank page and an image of the blank page so as to be separated from each other. The page classification correction portion corrects the page classification information according to correction operation. The file replacement portion replaces the primary image data file with a secondary image data file that does not include the data of the blank page.

6 Claims, 7 Drawing Sheets

IMAGE READING DEVICE AND IMAGE FORMING APPARATUS WITH BLANK PAGE SKIPPING FUNCTION

INCORPORATION BY REFERENCE

This application is based upon and claims the benefit of priority from the corresponding Japanese Patent Application No. 2015-036801 filed on Feb. 26, 2015, the entire contents of which are incorporated herein by reference.

BACKGROUND

The present disclosure relates to image reading device and image forming apparatuses.

In general, it has been known that a process of deleting data of a blank page from a plurality of pieces of page image data obtained by an image reading device scanning a document to read an image, is performed. Hereinafter, this process is referred to as a blank page skipping process.

For example, when the page image data is data in which the number of pixels having a density higher than a predetermined density is less than a predetermined number, the page is determined as the blank page.

The image reading device generates, in the blank page skipping process, an image data file that does not include data of the blank page. Therefore, a capacity, of a storage portion, which is necessary for storing the image data file can be reduced.

Further, in a case where an image forming apparatus that has the image reading device forms an image on a sheet material based on the image data file obtained in the blank page skipping process, an amount of consumables, such as developer and the sheet materials, to be used can be reduced.

SUMMARY

An image reading device according to one aspect of the present disclosure includes: an image scanning portion; a page classification portion; a primary file generation portion; a preview output portion; a page classification correction portion; and a file replacement portion. The image scanning portion is configured to scan a document sheet and read an image. The page classification portion is configured to classify a plurality of pieces of page image data obtained by the image scanning portion into data of a blank page that satisfies a predetermined blank sheet condition, and data of a non-blank page other than the data of the blank page. The primary file generation portion is configured to generate a primary image data file that includes: the data of the non-blank page; the data of the blank page; and page classification information, and store the primary image data file in a non-transitory computer-readable data storage portion. The preview output portion is configured to display, on a display portion, an image of the non-blank page and an image of the blank page in the primary image data file so as to separate the image of the non-blank page and the image of the blank page from each other. The page classification correction portion is configured to correct the page classification information in the primary image data file according to a predetermined correction operation. The file replacement portion is configured to replace the primary image data file stored in the data storage portion, with a secondary image data file that includes the data of the non-blank page and does not include the data of the blank page, when a predetermined determination condition is satisfied.

An image forming apparatus according to another aspect of the present disclosure includes the image reading device according to one aspect of the present disclosure, and an image of the non-blank page in the secondary image data file obtained by the image reading device is formed on a sheet material.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings. The following embodiment is an example embodying the present disclosure and does not have nature of limiting the technical scope of the present disclosure.

An image forming apparatus 10 is a malfunction peripheral having a function of a scanner, a function of a copying machine, and a function of a printer. Further, the image forming apparatus 10 may have a facsimile communication function.

An image reading device 1 performs a document sheet scanning transmission process, and thus functions as the scanner. The document sheet scanning transmission process includes a document image reading process and a scan file transmission process. The document image reading process is a process of reading an image of a document sheet 90, and generating document image data. The scan file transmission process is a process of transmitting, to another apparatus which is not shown, an image data file that includes the document image data obtained in the document image reading process.

The image forming apparatus 10 that functions as the copying machine performs a copying process of reading an image of the document sheet 90, and forming the image of the document sheet 90 on a sheet material 9. The copying process and the document sheet scanning transmission process are jobs received by the image forming apparatus 10 according to an operation performed by a user.

Further, the image forming apparatus 10 that functions as the printer receives, from another device which is not shown, print job data that is data to be printed, and forms, on the sheet material 9, an image represented by the print job data.

[Entire Configuration of Image Forming Apparatus]

Figure 1:
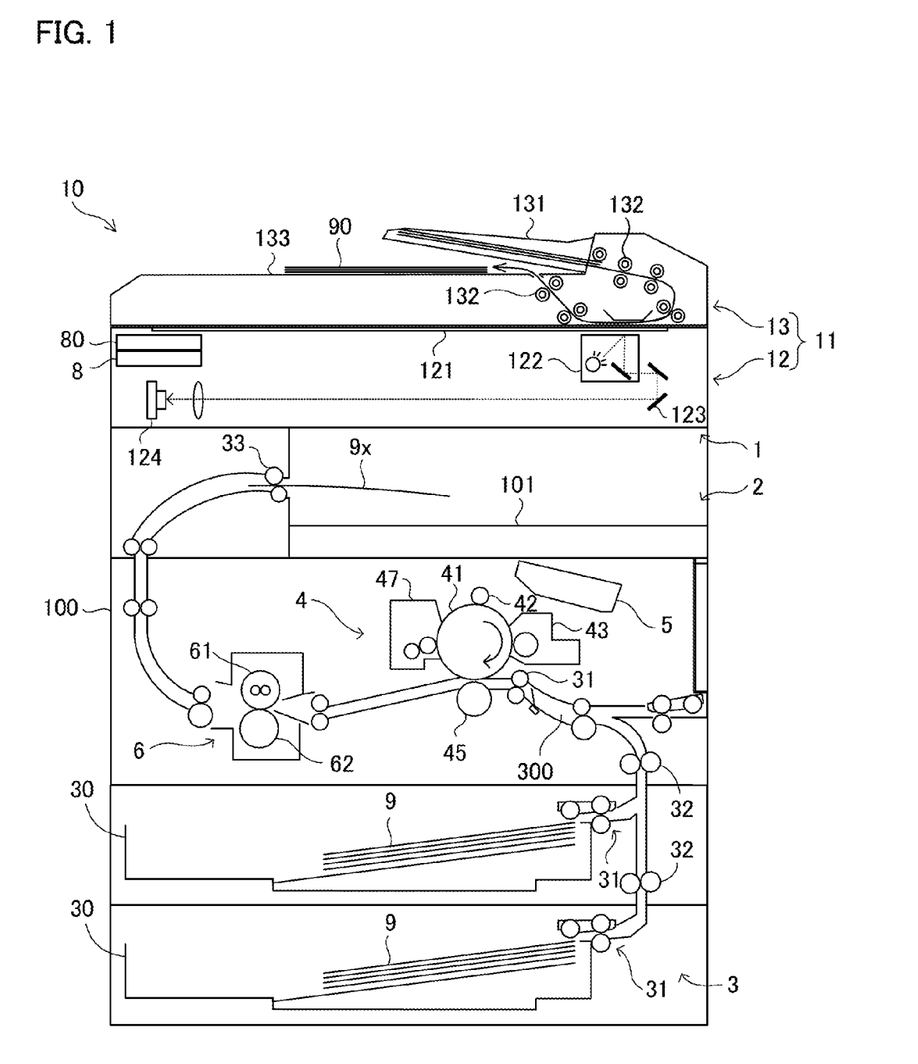
FIG. 1 illustrates a configuration of an image forming apparatus according to an embodiment.
Figure 2:
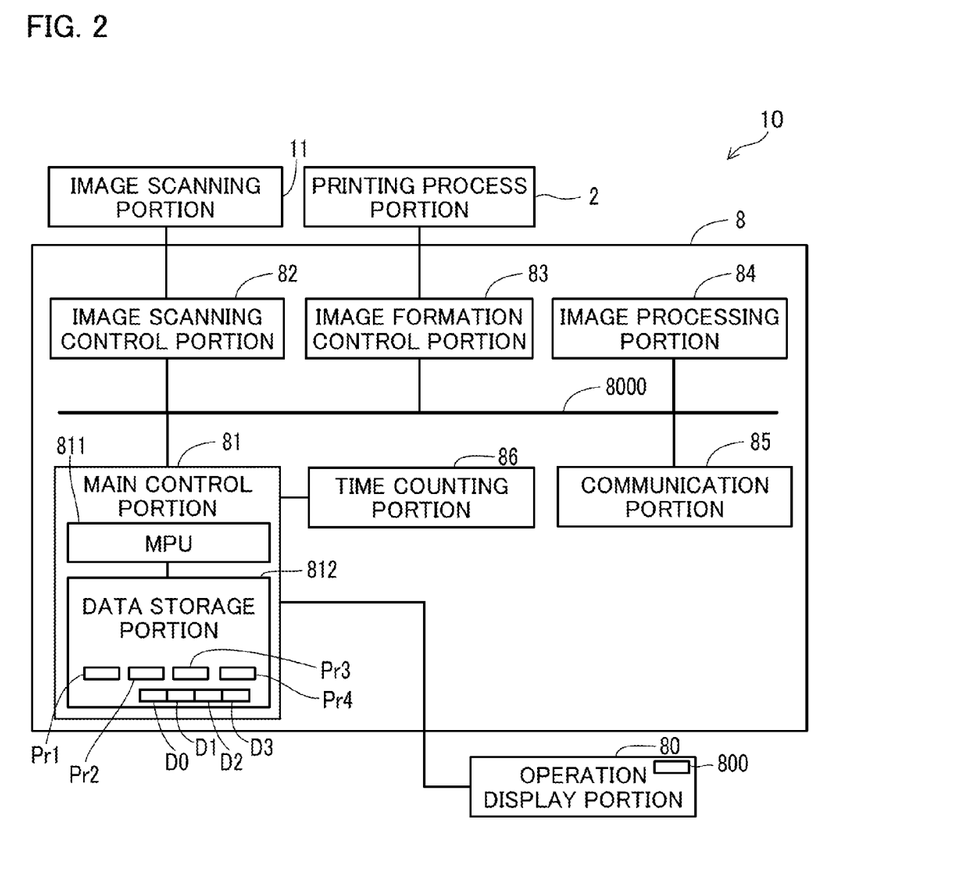
FIG. 2 is a block diagram illustrating portions for control in the image forming apparatus according to the embodiment.

Hereinafter, a configuration of the image forming apparatus 10 according to the embodiment will be described with reference to FIG. 1 to FIG. 3. The image forming apparatus 10 includes the image reading device 1 and a printing process portion 2. Further, the image forming apparatus 10 also includes a control portion 8, an operation display portion 80, and the like.

The image reading device 1 includes an image scanning portion 11 that performs the document image reading process. In the document image reading process, the document sheet 90 is scanned and an image is read, and image data obtained from the image is outputted.

The printing process portion 2 includes a sheet conveying portion 3, an image forming portion 4, an optical scanning portion 5, a fixing portion 6, and the like. The printing process portion 2 performs a printing process of forming, on the sheet material 9, an image represented by data for printing, and discharging, onto a discharged-sheet receiving portion 101, a printed article 9x that is the sheet material 9 on which the image has been formed. The printing process portion 2 performs the printing process by electrophotography.

The control portion 8 and the operation display portion 80 serve as a portion that performs control and information input for the image scanning portion 11 and the printing process portion 2. The control portion 8 and the operation display portion 80 serve as a part of the image reading device 1, and also serve as a portion for the other devices of the image forming apparatus 10.

The image scanning portion 11 includes an image reading portion 12 and an ADF (Auto Document Feeder) 13. The image reading portion 12 includes a document table 121, a reading unit 122, an optical system 123 such as a mirror and a lens, and an image sensor 124, etc.

The document table 121 is a portion on which the document sheet 90 is placed, and is provided at an upper surface of the image reading portion 12. The reading unit 122 applies light to the document sheet 90 that is present at a reading position on the document table 121, and reflects reflected light of the light toward the optical system 123. The reading unit 122 is movable in a sub-scanning direction. The sub-scanning direction is the right-left direction when FIG. 2 is seen.

The optical system 123 guides the reflected light from the document sheet 90, to the image sensor 124. The image sensor 124 includes a photoelectric conversion element, etc., and outputs an electric signal corresponding to an amount of received light, as image data representing the image of the document sheet 90, to the control portion 8.

The ADF 13 includes a plurality of conveying rollers 132 which convey the document sheet 90. The ADF 13 passes the document sheet 90 set on a document placement portion 131, through the reading position on the document table 121 and conveys the document sheet 90 to a discharged-document receiving portion 133.

The sheet conveying portion 3 includes a sheet-to-be-sent receiving portion 30 and a sheet sending-out portion 31. The sheet-to-be-sent receiving portion 30 is configured to allow a plurality of sheet materials 9 to be placed in a stacked manner thereon. The sheet material 9 is a sheet-like image recording medium such as paper, coated paper, postcards, envelopes, OHP sheets, and the like.

The sheet sending-out portion 31 sends out the sheet material 9 placed on the sheet-to-be-sent receiving portion 30, one by one, toward a conveyance path 300.

The sheet conveying portion 3 includes, for example, conveying rollers 32 configured to convey the sheet material 9 and discharge rollers 33. The conveying rollers 32 convey the sheet material 9 fed from the sheet-to-be-sent receiving portion 30, along the conveying path 300 toward the image forming portion 4. The discharge rollers 33 discharge the printed article 9x that is the sheet material 9 on which an image has been formed, through a discharge port of the conveyance path 300 onto the discharged-sheet receiving portion 101.

The image forming portion 4 forms an image on a surface of the sheet material 9 moving along the conveyance path 300. The image forming portion 4 includes a drum-shaped photosensitive member 41, a charging portion 42, a developing portion 43, a transfer portion 45, and a cleaning portion 47, etc. The photosensitive member 41 is an example of an image carrier.

The photosensitive member 41 rotates, and the charging portion 42 uniformly charges the surface of the photosensitive member 41. Furthermore, the optical scanning portion 5 performs scanning with laser light thereby to write an electrostatic latent image onto the charged surface of the photosensitive member 41, and the developing portion 43 supplies toner to the photosensitive member 41 thereby to develop the electrostatic latent image into a toner image.

Furthermore, the transfer portion 45 transfers the toner image on the photosensitive member 41, onto the sheet material 9 moving on the conveyance path 300. Finally, the cleaning portion 47 removes the toner remaining on the surface of the photosensitive member 41.

The fixing portion 6 nips the sheet material 9 on which the toner image has been formed, between a fixing roller 61 housing a heater and a pressure roller 62, and sends out the sheet material 9 to the following process step. By so doing, the fixing portion 6 fixes, onto the sheet material 9, the toner image (image) on the sheet material 9. The toner is an example of a developer.

Figure 3:
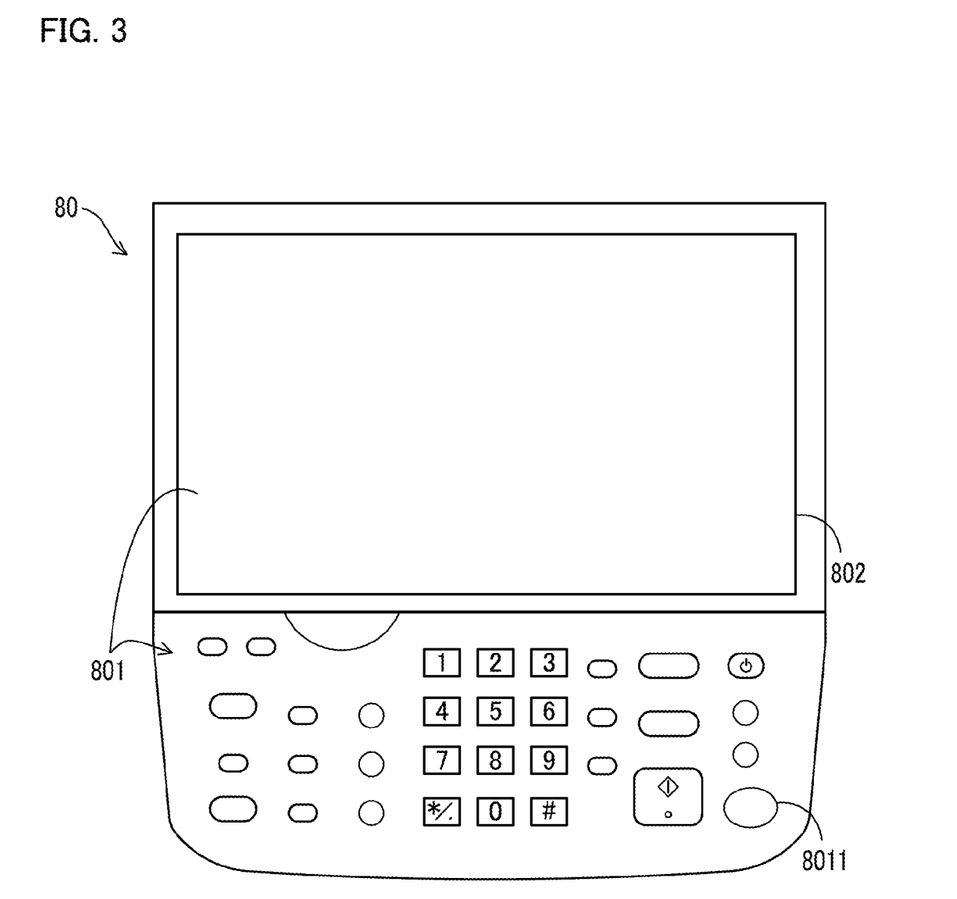
FIG. 3 is an external view of an operation display portion of the image forming apparatus according to the embodiment.

As shown in FIG. 3, the operation display portion 80 includes: an information input operation portion 801 including, for example, a touch panel and an operation key, etc.; and a display portion 802 including a liquid crystal display panel and a notification lamp, etc.

For example, the operation portion 801 may include an authentication information input portion 8011. The authentication information input portion 8011 is a component that allows user authentication information by which a user is identified to be inputted according to an operation performed by the user on the image forming apparatus 10.

For example, a fingerprint sensor configured to input fingerprint information as the user authentication information, an RFID reader (Radio Frequency IDentifier Reader) configured to read the user authentication information from an RF tag (Radio Frequency Tag) close thereto, through a short range wireless communication, or an IC card reader configured to read the user authentication information from an IC card, may be used as the authentication information input portion 8011.

The user authentication information may be text information such as a user identifier and a password that are inputted by, for example, the touch panel or the operation key of the operation portion 801.

[Control Portion 8]

The control portion 8 includes a main control portion 81, an image scanning control portion 82, an image formation control portion 83, an image processing portion 84, and a communication portion 85, etc. The main control portion 81 includes a MPU (Microprocessor Unit) 811 and a data storage portion 812, etc.

The main control portion 81, the image scanning control portion 82, the image formation control portion 83, the image processing portion 84, and the communication portion 85 are connected to a bus 8000 and are able to exchange data with one another via the bus 8000.

The MPU 811 is a processor which performs various types of calculation and data processing. The data storage portion 812 is a non-volatile storage portion which stores various types of information to which the MPU 811 refers. In addition, the data storage portion 812 is also a storage portion on which reading and writing of various types of information by the MPU 811 is enabled.

The data storage portion 812 stores data files of image data obtained from the image scanning portion 11 and other data. In the present embodiment, the data storage portion 812 also stores programs for causing the MPU 811 to perform various types of processing, and information to which the MPU 811 executing these programs refers, etc.

The main control portion 81 centrally controls the image forming apparatus 10 by the MPU 811 executing various programs stored previously in the data storage portion 812. The main control portion 81 also includes a volatile storage portion, such as a RAM, which temporarily stores a program for causing the MPU 811 to perform each step described later and is not shown.

For example, the main control portion 81 performs a user authentication process by the MPU 811 executing a user authentication program Pr1.

In the user authentication process, comparison between the user authentication information inputted through the authentication information input portion 8011, and registered user authentication information D0 stored previously in the data storage portion 812 or the like is performed to determine whether or not the user authentication information and the registered user authentication information D0 match each other, that is, to determine whether or not the user has been successfully authenticated.

Only when the determination result indicates that the user has been successfully authenticated in the user authentication process, the main control portion 81 allows the image forming apparatus 10 to be used. That is, the user authentication process is a process for allowing the image forming apparatus 10 including the image reading device 1 to be used.

The main control portion 81 in which the MPU 811 executes the user authentication program Pr1 is an example of a user authentication portion that performs the user authentication process for allowing the image forming apparatus 10 including the image reading device 1 to be used.

The image scanning control portion 82 controls the image scanning portion 11 to acquire image data of the document sheet 90 from the image reading portion 12. Furthermore, the image scanning control portion 82 transfers the document image data via the bus 8000 to another device such as the image processing portion 84 and the like.

The image formation control portion 83 acquires image data from the image processing portion 84 and causes the printing process portion 2 to perform the printing process based on the image data.

The image processing portion 84 performs various types of data processing on image data and the like acquired from another device via the bus 8000. A target for the data processing by the image processing portion 84 is, for example, the document image data acquired from the image reading portion 12 via the image scanning control portion 82, or the print job data acquired from a terminal apparatus 7 via the communication portion 85.

For example, the image processing portion 84 performs a process of converting the document image data acquired from the image scanning control portion 82 and the print job data acquired from the communication portion 85, into data for printing, and transferring the data for printing to the image formation control portion 83. Furthermore, the image processing portion 84 also has a function to perform image processing, such as image rotation processing, halftone processing, or size cut processing, on the document image data acquired from the image scanning control portion 82.

The communication portion 85 is a communication interface which performs transmission and reception of data to and from an external apparatus such as an information processing apparatus via a network. Furthermore, the communication portion 85 exchanges data with another device of the image forming apparatus 10 via the bus 8000.

The time counting portion 86 is a clock circuit which counts time. Count information of the time counting portion 86 is transmitted to the main control portion 81.

In the image reading device 1, the image processing portion 84 also performs the blank page skipping process. The blank page skipping process is a process of deleting data of a blank page from a plurality of pieces of page image data obtained by the document sheet 90 being scanned to read an image.

By the blank page skipping process, an image data file that does not include the data of the blank page is generated. By the blank page skipping process, a capacity, of the storage portion, which is necessary for storing the image data file can be reduced.

Further, when the printing process portion 2 forms an image on the sheet material 9 based on the image data file obtained in the blank page skipping process, an amount of consumables, such as the toner and the sheet material 9, to be used, can be reduced.

A result of determination as to the blank page in the blank page skipping process is not as intended by a user in some cases. In these cases, it is bothersome to cancel the function of the blank page skipping process or change the blank page determination condition and then perform again an operation for the image reading process.

Meanwhile, when the image forming apparatus 10 that includes the image reading device 1 is used, a result of deletion as intended by a user can be easily obtained in the blank page skipping process. Hereinafter, the details thereof will be described.

[Document Image Scanning and Outputting Process]

In the image forming apparatus 10, after a determination result indicating that a user has been successfully authenticated in the user authentication process is obtained, the main control portion 81 performs a document image scanning and outputting process when detecting that a predetermined document scanning start operation has been performed on the operation portion 801.

The document image scanning and outputting process is a process of causing the image scanning portion 11 to perform the document image reading process and performing image output based on the document image data having been obtained in the document image reading process.

Before the document scanning start operation is performed, a type of the image output to be performed in the document image scanning and outputting process is selected through an operation performed on the operation portion 801.

Options of the image output include, for example, the printing process of forming, on the sheet material 9, an image represented by the document image data, and the scan file transmission process of transmitting, to the external device, an image data file including the document image data.

Further, before the document scanning start operation is performed, whether or not a blank sheet skipping mode in which the blank page skipping process is performed is enabled or disabled, is determined according to an operation performed on the operation portion 801. For example, the blank sheet skipping mode is set so as to be disabled in the initial state.

The document image scanning and outputting process is performed by the MPU 811 executing a document image scanning and outputting program Pr2.

Figure 4:
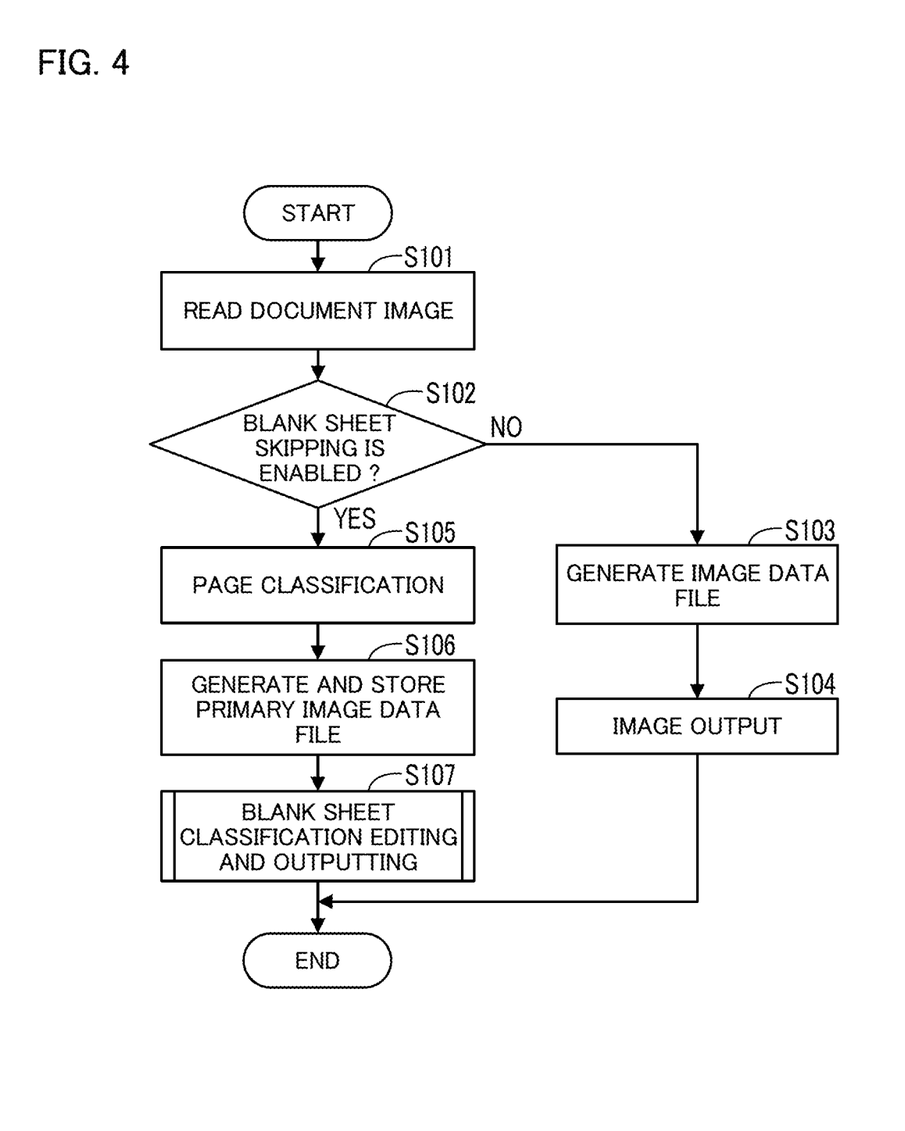
FIG. 4 is a flow chart showing an example of a procedure of a document image scanning and outputting process performed by the image forming apparatus according to the embodiment.

Hereinafter, an example of a procedure of the document image scanning and outputting process will be described with reference to a flowchart shown in FIG. 4. In the following description, S101, S102, . . . represent identification characters for respective steps performed by the main control portion 81.

<Step S101>

In the document image scanning and outputting process, through the image scanning control portion 82, the main control portion 81 firstly causes the image scanning portion 11 to perform the document image reading process. When a plurality of the document sheets 90 are set in the ADF 13, the image data for a plurality of pages is obtained. Hereinafter, the document image data for one page is referred to as page image data.

<Step S102>

Next, the main control portion 81 determines whether or not the blank sheet skipping mode is set so as to be enabled in advance.

<Step S103>

When the blank sheet skipping mode is set so as to be disabled, the main control portion 81 causes the image processing portion 84 to perform an image data file generation process, and causes the data storage portion 812 to temporarily store an image data file obtained in the image data file generation process.

The image data file generation process is a process of generating the image data file that includes one piece or a plurality of pieces of the page image data obtained in the document image reading process.

The image data file is a data file in a format by which one file including a plurality of pieces of the page image data can be configured. For example, the image data file may be a PDF or TIFF data file.

<Step S104>

Further, the main control portion 81 performs the image output of the image data file generated by the image processing portion 84. The image output to be performed is the printing process or the scan file transmission process which is selected in advance.

<Step S105>

Meanwhile, when the blank sheet skipping mode is set so as to be enabled, the main control portion 81 causes the image processing portion 84 to perform a page classification process. The main control portion 81 and the image processing portion 84 that perform the process step of step S105 represent an example of a page classification portion.

The page classification process is a process of classifying a plurality of pieces of the page image data obtained in the document image reading process into data of blank pages that satisfy a predetermined blank sheet condition, and data of non-blank pages other than the data of the blank pages.

For example, the blank sheet condition may be a logical disjunction of a plurality of types of conditions. In this case, a first blank sheet condition may be a condition that the number of pixels each having a density higher than a predetermined threshold density value is less than a predetermined threshold number of pixels.

Further, a second blank sheet condition may be a condition that a ratio of pixels of a ruled line image among pixels each having a density higher than the threshold density value is greater than a predetermined threshold ratio.

In the second blank sheet condition, the ruled line image represents a plurality of line-shaped images formed along the main scanning direction or the sub scanning direction so as to be aligned at intervals set in a predetermined range.

Furthermore, a third blank sheet condition may be a condition that, in a case where images are read on both sides of the document sheet 90 in the document image reading process, the page image data on one of both the sides and the page image data on the other of both the sides approximate to each other to a predetermined approximation degree or greater degree. The approximation degree is derived by a well-known pattern matching process or the like. In this case, the page image data having a lower image density is classified as data of the blank page.

The data of the blank page represents data that is classified as the blank page among a plurality of pieces of the page image data obtained in the document image reading process. Similarly, the data of the non-blank page represents the remaining data which is not classified as the blank page among the plurality of pieces of the page image data obtained in the document image reading process.

In the present embodiment, the blank sheet condition is set for each user for which the user authentication process is performed. That is, the blank sheet condition is set for each registered user authentication information D0. In the initial state, the same predetermined blank sheet condition is set for each registered user authentication information D0.

In step S105, the main control portion 81 causes the image processing portion 84 to perform the page classification process using the blank sheet condition corresponding to the registered user authentication information D0 used in the user authentication process that has previously succeeded.

<Step S106>

Next, the main control portion 81 causes the image processing portion 84 to perform a primary image data file generation process, and causes the data storage portion 812 to store a primary image data file D1 obtained in the primary image data file generation process. The main control portion 81 that performs the process step of step S106 is an example of a primary file generation portion.

The primary image data file D1 is an image data file that includes data of the non-blank pages, data of the blank pages, and page classification information. For example, the primary image data file D1 is a data file in a format by which one file that includes a plurality of the page images can be configured. The primary image data file D1 may be a PDF or TIFF data file.

The page classification information is information by which whether each page of the plurality of pieces of the page image data included in the primary image data file D1 is classified as the blank page or the non-blank page is determined. For example, the page classification information is set as attribute information such as metadata in the primary image data file D1.

Further, the primary image data file D1 also includes, as the attribute information, date and time information such as information on date and time of generation and information on date and time of correction. Further, the primary image data file D1 may include creator information as the attribute information.

For example, user information such as a user name may be stored in the data storage portion 812 in advance as a part of the registered user authentication information D0 or stored in the data storage portion 812 in advance so as to be associated with the registered user authentication information D0. In this case, the main control portion 81 identifies the user information corresponding to the registered user authentication information D0 used in the user authentication process that has previously succeeded, and incorporates the user information as the creator information into the primary image data file D1.

The primary image data file D1 is stored in the data storage portion 812 so as to be associated with the registered user authentication information D0 used in the user authentication process that has previously succeeded. For example, in the data storage portion 812, a data folder is set for each registered user authentication information D0. In this case, the main control portion 81 stores the primary image data file D1 in the data folder corresponding to the registered user authentication information D0 used in the user authentication process that has previously succeeded.

<Step S107>

Next, the main control portion 81 performs a blank sheet classification editing and outputting process described below. After step S104 or step S107, the document image scanning and outputting process is ended.

[The Blank Sheet Classification Editing and Outputting Process]

The blank sheet classification editing and outputting process includes a preview output process, a page classification correction process, a file replacement process, and a process for the image output. Each process will be described below in detail.

Hereinafter, an example of a procedure of the blank sheet classification editing and outputting process will be described with reference to a flow chart shown in FIG. 5. In the following description, S201, S202, . . . represent identification characters for respective steps performed by the main control portion 81.

The blank sheet classification editing and outputting process is performed by the MPU 811 executing a blank sheet classification editing and outputting program Pr3.

<Step S201>

In the blank sheet classification editing and outputting process, the main control portion 81 firstly performs the preview output process. The preview output process is a process of separating an image of the non-blank page and an image of the blank page in the primary image data file D1 from each other, and displaying the images on the display portion 802. The main control portion 81 that performs the process step of step S201 is an example of a preview output portion.

The main control portion 81 sets, as a subject for which the preview output process is to be performed, the primary image data file D1 corresponding to the registered user authentication information D0 used in the user authentication process that has previously succeeded.

In a case where the number of the primary image data files D1 corresponding to the registered user authentication information D0 is plural, the main control portion 81 selects one of the primary image data files D1 as the subject for which the preview output process is to be performed, according to an operation performed on the operation portion 801.

Figure 7:
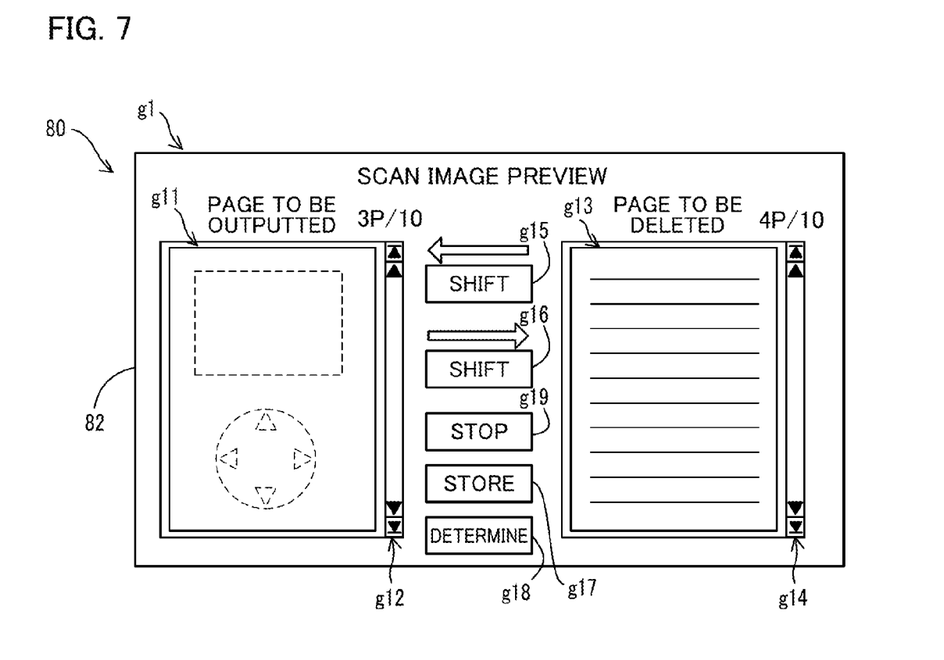
FIG. 7 illustrates a scan image preview screen that is outputted by the image forming apparatus according to the embodiment.

In step S201, the main control portion 81 causes the display portion 802 to display, for example, a scan image preview screen g1 as shown in FIG. 7. On the scan image preview screen g1, an image of the non-blank page is displayed in a non-blank page image display box g11, and an image of the blank page is displayed in a blank page image display box g13.

In the example shown in FIG. 7, the images of the non-blank page and the blank page are displayed such that the display areas thereof are separated. In other examples, the images of the non-blank page and the blank page may be separated by additional marks, or shapes or colors of the boxes, or the like.

Further, the scan image preview screen g1 includes a non-blank page selection operation portion g12 for receiving an operation of selecting the non-blank page, and a blank page selection operation portion g14 for receiving an operation of selecting the blank page.

In the following description, the non-blank page selected according to an operation performed on the non-blank page selection operation portion g12 is referred to a non-blank page under selection. Similarly, the blank page selected according to an operation performed on the blank page selection operation portion g14 is referred to as a blank page under selection.

The main control portion 81 displays, in the non-blank page image display box g11, an image of the non-blank page under selection. Similarly, the main control portion 81 displays, in the blank page image display box g13, an image of the blank page under selection.

Further, in the example shown in FIG. 7, the scan image preview screen g1 includes a shift-to-non-blank-sheet operation icon g15, a shift-to-blank-sheet operation icon g16, a storage operation icon g17, a determination operation icon g18, a stop operation icon g19, and the like.

An operation on each operation icon is, for example, an operation performed on a touch panel, or an operation performed on a cursor moving key or execution key, in the operation portion 801.

<Step S202>

Further, the main control portion 81 performs the page classification correction process. The page classification correction process is a process of correcting the page classification information in the primary image data file D1 according to a predetermined correction operation performed on the operation portion 801. The main control portion 81 that performs the process step of step S202 is an example of a page classification correction portion.

The correction operation is one of; a shift-to-non-blank-sheet operation for making such a correction as to change from the blank page to the non-blank page; or a shift-to-blank-sheet operation for making such a correction as to change from the non-blank page to the blank page. In the present embodiment, the operation performed on the shift-to-non-blank-sheet operation icon g15 on the scan image preview screen g1 corresponds to the shift-to-non-blank-sheet operation, and the operation performed on the shift-to-blank-sheet operation icon g16 on the scan image preview screen g1 corresponds to the shift-to-blank-sheet operation.

When the shift-to-non-blank-sheet operation icon g15 is operated, the main control portion 81 corrects classification of the blank page under selection in the page classification information so as to be set as the non-blank page. Meanwhile, when the shift-to-blank-sheet operation icon g16 is operated, the main control portion 81 corrects classification of the non-blank page under selection in the page classification information so as to be set as the blank page.

<Steps S203, S204>

Further, the main control portion 81 determines whether or not the storage operation or the determination operation has been performed on the operation portion 801, and the process steps of steps S201 to S202 are repeated until one of the storage operation or the determination operation is performed.

In the present embodiment, the storage operation and the determination operation are an operation on the storage operation icon g17 and an operation on the determination operation icon g18, respectively, on the scan image preview screen g1.

Figure 5:
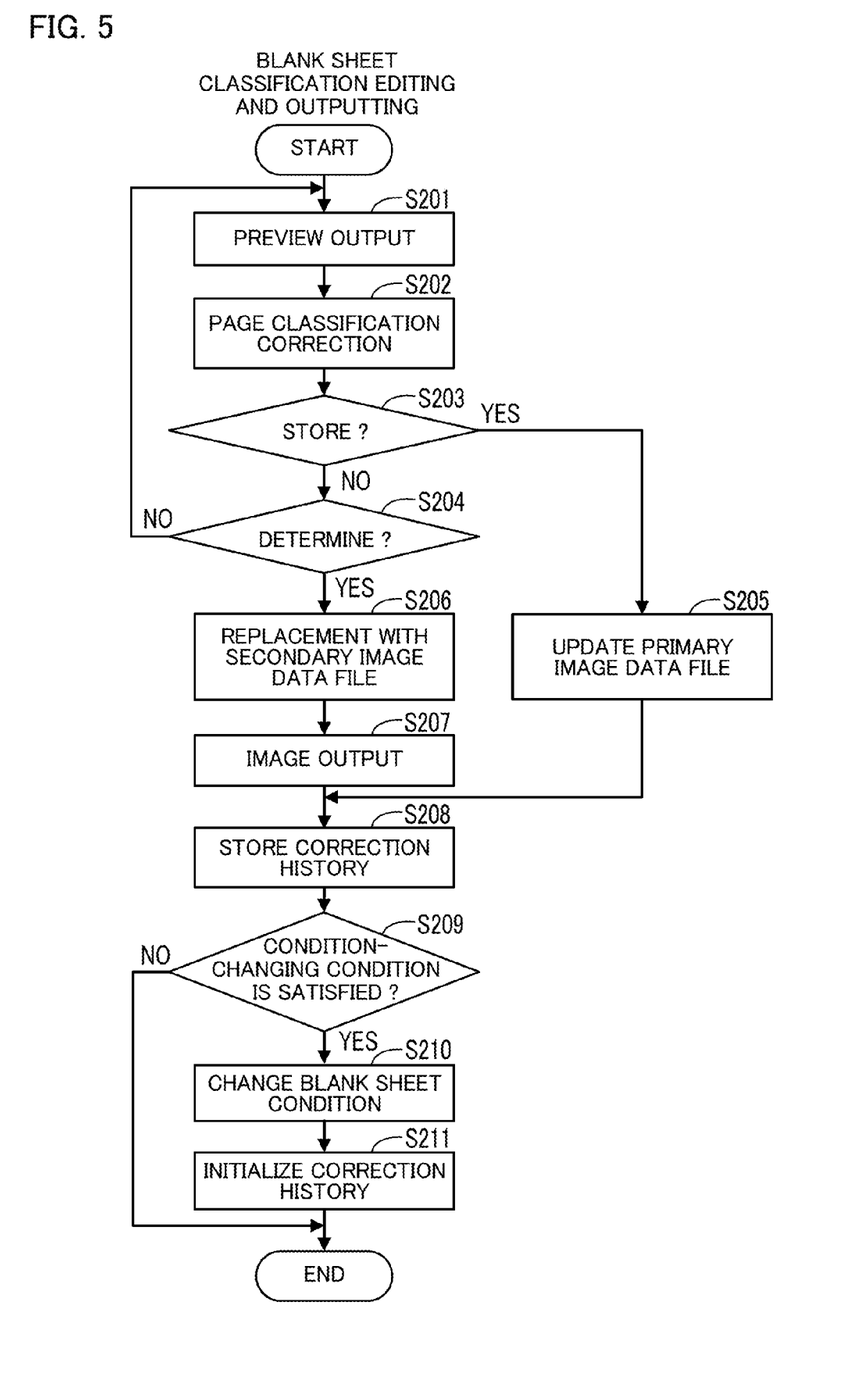
FIG. 5 is a flow chart showing an example of a procedure of a blank sheet classification editing and outputting process performed by the image forming apparatus according to the embodiment.

When a stop operation is performed on the operation portion 801, which is not shown in FIG. 5, the main control portion 81 ends the blank sheet classification editing and outputting process.

<Step S205>

When the storage operation is detected, the main control portion 81 updates the primary image data file D1 in the data storage portion 812 to the primary image data file D1 that includes the page classification information having been corrected in step S202. After step S205 ends, the main control portion 81 performs the process steps from step S208 described below.

<Step S206>

Meanwhile, when the determination operation is detected, the main control portion 81 performs the file replacement process. The file replacement process is a process of replacing the primary image data file D1 stored in the data storage portion 812 with a secondary image data file D2.

The secondary image data file D2 is an image data file that includes the page image data classified as the non-blank page in the primary image data file D1, and does not include the page image data classified as the blank page in the primary image data file D1. That is, the page image data classified as the blank page in the primary image data file D1 is deleted in step S206.

The main control portion 81 that performs the process steps of steps S204, S206 is an example of a file replacement portion that replaces the primary image data file D1 with the secondary image data file D2 when a predetermined determination condition is satisfied. Further, performing the determination operation on the operation portion 801 is an example of the determination condition.

<Step S207>

Further, the main control portion 81 performs the image output for the secondary image data file D2. The image output to be performed is the previously selected printing process or scan file transmission process. The secondary image data file D2 for which the image output is performed is deleted from the data storage portion 812.

When the printing process is selected as the image output, the printing process portion 2 forms, on the sheet material 9, an image of the non-blank pages in the secondary image data file D2 obtained by the image reading device 1. Thus, an amount of consumables, such as the toner and the sheet material 9, to be used can be reduced.

<Step S208>

Further, in step S208, the main control portion 81 stores, in the data storage portion 812, correction history information D3 representing a history of correction, in step S202, of the page classification information. The main control portion 81 that performs the process step of step S208 is an example of a correction history storage portion.

The correction history information D3 is stored so as to be associated with the registered user authentication information D0 used in the user authentication process that has previously succeeded. That is, the correction history information D3 is stored for each user for which the user authentication process is performed.

The correction history information D3 is information by which at least the frequency of correction for each of the shift-to-non-blank-sheet and the shift-to-blank-sheet can be identified. For example, the correction history information D3 may include, as information representing the frequency of correction, the number of times the correction for the shift-to-non-blank-sheet has been performed, and the number of times the correction for the shift-to-blank-sheet has been performed.

Further, the main control portion 81 may store, as the correction history information D3, all the corrected contents for page classification. In this case, the number of times the correction for each of the shift-to-non-blank-sheet and the shift-to-blank-sheet has been performed can be counted up based on the contents of the correction history information D3.

Further, before the correction history information D3 is stored, the main control portion 81 may cause the image processing portion 84 to perform the page classification process for the page image data for which the page classification is corrected. The main control portion 81 stores the correction history information D3 for only pages at which a result of the page classification in this page classification process, and the page classification represented by the most recent page classification information are different from each other.

The correction history information D3 is stored only when the most recent page classification information and the result of this page classification process are different from each other, whereby incorrect correction history information D3 is prevented from being stored when the page classification is returned to the original classification by plural corrections of the page classification.

Further, the main control portion 81 may incorporate, into the correction history information D3, information representing the type of the blank sheet condition that has been satisfied in the page classification process performed before the correction history information D3 is stored, such that the information representing the type of the blank sheet condition is associated with corrected contents. Thus, the blank sheet condition, among the plurality of the blank sheet conditions, which causes a result of the page classification which is not intended by a user, can be identified.

<Step S209>

Next, the main control portion 81 determines whether or not a predetermined condition-changing condition is satisfied. The condition-changing condition is a condition under which change of the blank sheet condition based on the correction history information D3 is allowed.

The condition-changing condition includes at least a correction frequency condition that the frequency of correction of the page classification represented by the correction history information D3 has reached a predetermined threshold frequency. For example, the correction frequency condition may be a condition that the number of times of corrections of the page classification represented by the correction history information D3 is greater than a predetermined threshold number of times.

Further, the correction frequency condition may be a condition that a difference between the number of times of corrections for the shift-to-blank-sheet, which is represented by the correction history information D3, and the number of times of corrections for the shift-to-non-blank-sheet, which is represented by the correction history information D3, is greater than a predetermined threshold number of times. The condition indicates that the correction in the page classification for one of the shift-to-blank-sheet and the shift-to-non-blank-sheet is performed more frequently than for the other thereof.

In the present embodiment, the condition-changing condition is a condition that the correction frequency condition is satisfied, and a predetermined operation for allowing the change is performed on the operation portion 801.

Figure 8:
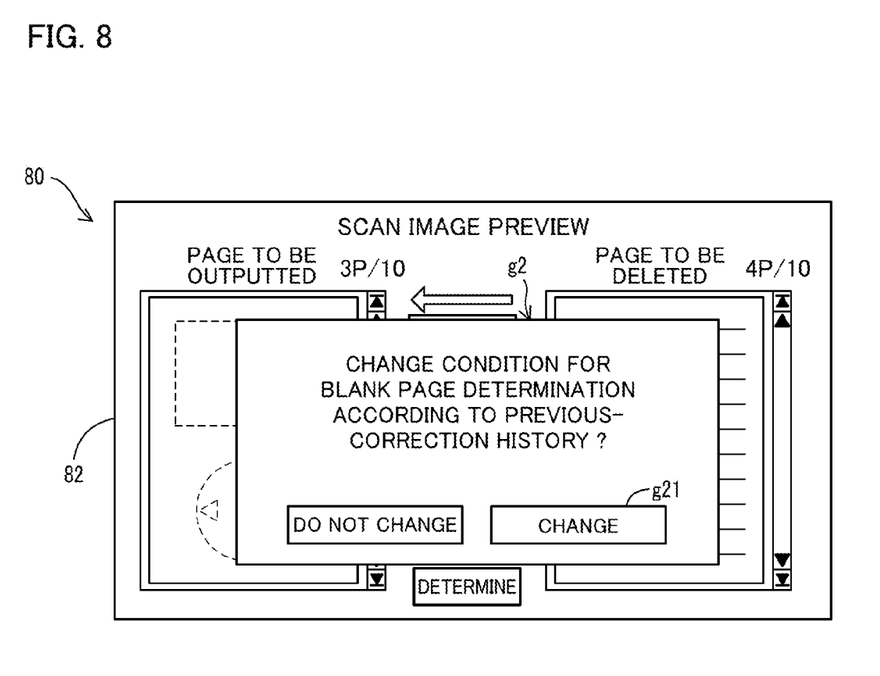
FIG. 8 illustrates a blank sheet condition change determination screen that is outputted by the image forming apparatus according to the embodiment.

In step S209, when the correction frequency condition is satisfied, the main control portion 81 outputs a blank sheet condition change determination screen g2 as shown in FIG. 8, to the display portion 802. When an affirmative operation icon g21 on the blank sheet condition change determination screen g2 is operated, the main control portion 81 determines that the condition-changing condition is satisfied.

<Step S210>

When the condition-changing condition is satisfied, the main control portion 81 changes the blank sheet condition according to the correction history information D3. That is, when the correction history information D3 indicates that the frequency of correction for the shift-to-non-blank-sheet is high, the main control portion 81 changes the blank sheet condition so as to tighten the blank sheet condition. Meanwhile, when the correction history information D3 indicates that the frequency of correction for the shift-to-blank-sheet is high, the main control portion 81 changes the blank sheet condition so as to alleviate the blank sheet condition.

Change for tightening the blank sheet condition represents change to a condition under which the page image data is more likely to be classified as data of the non-blank page than under the original condition. Meanwhile, change for alleviating the blank sheet condition represents change to a condition under which the page image data is more likely to be classified as data of the blank page than under the original condition.

For example, as a method for change for tightening the blank sheet condition, a method can be considered in which one or both of: the threshold density value that is a threshold value for an image density under the blank sheet condition; and the threshold number of pixels which is a threshold value for the number of pixels under the blank sheet condition, is changed so as to be less than the original value or number.

Meanwhile, as a method for change for alleviating the blank sheet condition, a method can be considered in which one or both of the threshold density value and the threshold number of pixels under the blank sheet condition is changed so as to be greater than the original value or number.

Further, as another method for change for tightening the blank sheet condition, a method can be considered in which a part, of the plurality of the blank sheet conditions, which have been disabled, is changed so as to be enabled. Further, as another method for change for alleviating the blank sheet condition, a method can be considered in which a part, of the plurality of the blank sheet conditions, which has been enabled, is changed so as to be disabled. The disabled blank sheet condition is a condition excluded from the conditions based on which the blank sheet is identified in the page classification process.

Further, as described above, the correction history information D3 may include information representing the type of the blank sheet condition that has been satisfied in the page classification process. In this case, the main control portion 81 may change only the blank sheet condition of a type corresponding to the contents of the page classification which are changed with high frequency.

In step S210, the main control portion 81 changes the blank sheet condition corresponding to the registered user authentication information D0 used in the user authentication process that has previously succeeded. That is, the main control portion 81 changes, according to the result of correction of the page classification information for each user, the blank sheet condition for the corresponding user.

The process step of step S210 is an example of a process of changing the blank sheet condition so as to tighten the blank sheet condition or so as to alleviate the blank sheet condition, according to whether correction of the page classification information in the primary image data file D1 is the shift to non-blank sheet or the shift to blank sheet. That is, the main control portion 81 that performs the process step of step S210 is an example of a blank sheet condition changing portion.

<Step S211>

Further, the main control portion 81 initializes the correction history information D3. The correction history information D3 corresponding to the registered user authentication information D0 used in the user authentication process that has previously succeeded is initialized.

When the condition-changing condition is not satisfied in step S209, or after the process step of step S211 has been performed, the blank sheet classification editing and outputting process is ended.

The primary image data file D1 generated in step S106 may be left as it is in the data storage portion 812 by an operation of stopping the blank sheet classification editing and outputting process being performed. Similarly, the primary image data file D1 having been updated in step S205 may remain in the data storage portion 812.

Also when a predetermined blank sheet classification editing start operation is performed on the operation portion 801 after the user authentication process, the main control portion 81 performs the blank sheet classification editing and outputting process shown in FIG. 5. Thus, the primary image data file D1 is deleted from the data storage portion 812 after the process steps of steps S206, S207.

As described above, in the present embodiment, the blank page skipping process includes the page classification process (S105), the process of generating the primary image data file D1 (S106), the preview output process (S201), the page classification correction process (S202), and the file replacement process (S206).

In the present embodiment, when a result of classification in the page classification process (S105) is not as intended by a user, the user is allowed to correct the page classification, thereby obtaining a desired image output result. At this time, the user is allowed to easily correct the page classification by the correction operation performed on the operation portion 801 while confirming an image outputted in the preview output process (S201).

Therefore, according to the present embodiment, in the blank page skipping process in which data of the blank page is deleted from the page image data obtained by the document sheet 90 being scanned, the result of deletion as intended by the user can be easily obtained.

Further, the image reading device 1 changes the blank sheet condition according to the corrected contents of the page classification (S210). Thus, the blank sheet condition is changed as intended by the user. As a result, the result of the blank page skipping process as intended by the user is more likely to be obtained.

Further, the image reading device 1 changes the blank sheet condition according to the correction history information D3 by which the frequency of the correction of the page classification can be identified. In this case, the exceptional contents, of the page classification, which are less frequently changed can be prevented from being reflected for change of the blank sheet condition. As a result, accuracy for changing the blank sheet condition is enhanced.

Further, in the present embodiment, the blank sheet condition used in the page classification process is set for each user. Therefore, a result of the blank page skipping process under the blank sheet condition is likely to be obtained as intended by each of a plurality of users.

When a user does not perform the blank sheet classification editing start operation, unnecessary page image data classified as the blank page may continue to be left in the primary image data file D1.

Therefore, the main control portion 81 performs a process of managing expiration for the primary image data file each time a predetermined expiration management start event occurs. The process of managing expiration for the primary image data file D1 is a process of replacing, with the secondary image data file D2, a file, among the primary image data files D1 remaining in the data storage portion 812, which has reached a predetermined expiry time.

For example, the expiration management start event may be, for example, a timer event that occurs at predetermined intervals, a reception event in which a command is received via the network from a transmitter that is a predetermined person in charge of the management, or an operation event in which a predetermined start operation by the person in charge of the management is detected via the operation portion 801.

[Process of Managing Expiration for Primary Image Data File D1]

Figure 6:
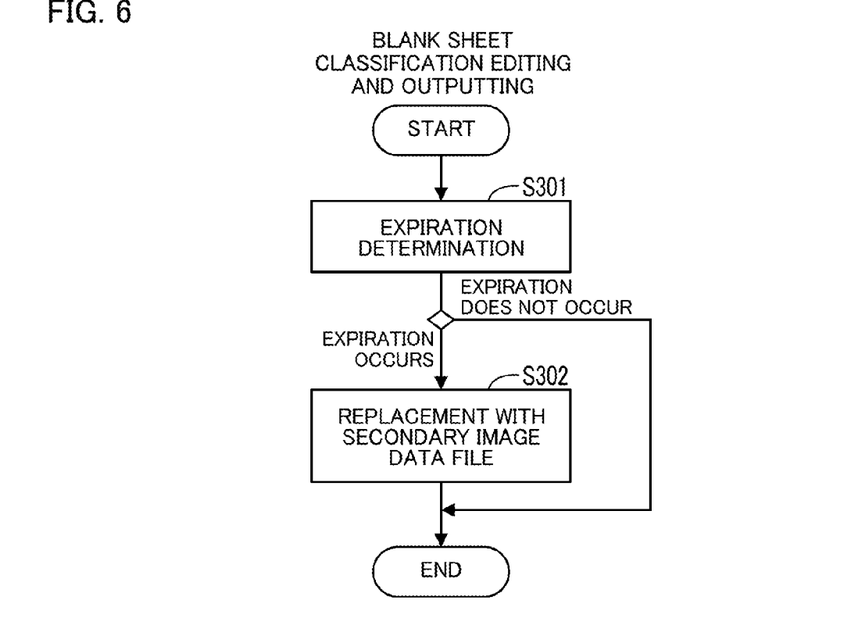
FIG. 6 is a flow chart showing an example of a procedure of a process of managing expiration for a primary image data file according to the embodiment.

Hereinafter, an example of a procedure of the process of managing expiration for the primary image data file D1 will be described with reference to a flow chart shown in FIG. 6. In the following description, S301, S302 represent identification characters for respective steps performed by the main control portion 81.

The process of managing expiration for the primary image data file D1 is performed by the MPU 811 executing a primary image data file expiration management program Pr4.

<S301>

In the process of managing expiration for the primary image data file D1, the main control portion 81 firstly performs expiration determination process of determining whether or not the primary image data file D1 stored in the data storage portion 812 is a file that has expired.

In the expiration determination process, when a date and time represented by the information on date and time of generation or the information on date and time of correction, which are included as the attribute information in the primary image data file D1, is previous to a point of time before a predetermined grace period, the main control portion 81 determines that the primary image data file D1 is the file that has expired.

For example, the grace period is set in advance through the operation portion 801. Further, one, of the information on date and time of generation or the information on date and time of correction, which is to be used for determination is predetermined. The main control portion 81 that performs the process step of step S301 is an example of an expiration determination portion.

When the primary image data file D1 determined as the file that has expired is absent, the main control portion 81 ends the process of managing expiration for the primary image data file D1. Meanwhile, when the primary image data file D1 determined as the file that has expired is present, the main control portion 81 performs the subsequent step S302.

<Step S302>

In step S302, the main control portion 81 performs the file replacement process for the primary image data file D1 having been determined as the file that has expired, as in step S206. Thus, the page image data classified as the blank page in the file that has expired is deleted. After step S302, the process of managing expiration for the primary image data file D1 is ended.

APPLICATION EXAMPLE

In the embodiment described above, the primary image data file D1 may be a group of files that include a data file including the page image data and a file including the page classification information.

Further, in the blank sheet classification editing and outputting process shown in FIG. 5, steps S208 and S211 of storing and initializing the correction history information D3 may be omitted. In this case, in step S210, the main control portion 81 changes the blank sheet condition according to the contents, of the page classification information, which are corrected once.

Further, the data storage portion 812 that stores the primary image data file D1 may be a storage portion of another apparatus that is communicable with the image forming apparatus 10. In this case, the main control portion 81 transmits the primary image data file D1 with a predetermined command to the other apparatus, thereby allowing the primary image data file D1 to be stored in the storage portion of the other apparatus.

The image reading device and the image forming apparatus according to the present disclosure, can be implemented by optionally combining the embodiment and the application examples as described above, or by modifying or partially omitting the embodiment and the application examples as appropriate within the scope of the disclosure defined by claims.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
an image scanning portion including an image sensor configured to receive reflection light of light irradiated on a document sheet, the image scanning portion configured to read an image of the document sheet by the image sensor;
a page classification portion, operatively coupled to the image scanning portion and a processor of a computing device, configured to perform a page classification process of classifying a plurality of pieces of page image data obtained by the image scanning portion into data of a blank page that satisfies a predetermined blank sheet condition, and data of a non-blank page other than the data of the blank page;
a primary file generation portion, operatively coupled to the processor of the computing device, configured to generate a primary image data file that includes: the data of the non-blank page; the data of the blank page; and page classification information, and store the primary image data file in a non-transitory computer-readable data storage portion;
a preview output portion, operatively coupled to the processor of the computing device, configured to display, on a display portion, an image of the non-blank page and an image of the blank page in the primary image data file so as to separate the image of the non-blank page and the image of the blank page from each other;
a page classification correction portion, operatively coupled to the processor of the computing device, configured to correct the page classification information in the primary image data file according to a predetermined correction operation;
a file replacement portion, operatively coupled to the processor of the computing device, configured to replace the primary image data file stored in the data storage portion, with a secondary image data file that includes the data of the non-blank page and does not include the data of the blank page, when a predetermined determination condition is satisfied;
a blank sheet condition changing portion, operatively coupled to the processor of the computing device, configured to change the blank sheet condition so as to tighten or alleviate the blank sheet condition, according to whether correction of the page classification information in the primary image data file is shift-to-non-blank-sheet for change from the blank page to the non-blank page, or shift-to-blank-sheet for change from the non-blank page to the blank page; and
a correction history storage portion, operatively coupled to the processor of the computing device, configured to store, when the page classification information in the primary image data file is corrected, correction history information by which frequency of correction for each of the shift-to-non-blank-sheet and the shift-to-blank-sheet can be identified, wherein
the blank sheet condition changing portion changes the blank sheet condition according to the correction history information.

2. An image forming apparatus comprising
the image reading device according to claim 1, wherein
an image of the non-blank page in the secondary image data file obtained by the image reading device is formed on a sheet material.

3. An image reading device comprising:
an image scanning portion including an image sensor configured to receive reflection light of light irradiated on a document sheet, the image scanning portion configured to read an image of the document sheet by the image sensor;
a page classification portion, operatively coupled to the image scanning portion and a processor of a computing device, configured to perform a page classification process of classifying a plurality of pieces of page image data obtained by the image scanning portion into data of a blank page that satisfies a predetermined blank sheet condition, and data of a non-blank page other than the data of the blank page;
a primary file generation portion, operatively coupled to the processor of the computing device, configured to generate a primary image data file that includes: the data of the non-blank page; the data of the blank page; and page classification information, and store the primary image data file in a non-transitory computer-readable data storage portion;
a preview output portion, operatively coupled to the processor of the computing device, configured to display, on a display portion, an image of the non-blank page and an image of the blank page in the primary image data file so as to separate the image of the non-blank page and the image of the blank page from each other;
a page classification correction portion, operatively coupled to the processor of the computing device, configured to correct the page classification information in the primary image data file according to a predetermined correction operation;
a file replacement portion, operatively coupled to the processor of the computing device, configured to replace the primary image data file stored in the data storage portion, with a secondary image data file that includes the data of the non-blank page and does not include the data of the blank page, when a predetermined determination condition is satisfied;
a blank sheet condition changing portion, operatively coupled to the processor of the computing device, configured to change the blank sheet condition so as to tighten or alleviate the blank sheet condition, according to whether correction of the page classification information in the primary image data file is shift-to-non-blank-sheet for change from the blank page to the non-blank page, or shift-to-blank-sheet for change from the non-blank page to the blank page; and
a user authentication portion, operatively coupled to the processor of the computing device, configured to perform a user authentication process for allowing the image reading device to be used, wherein
the page classification portion performs the page classification process by using the blank sheet condition set for each user for which the user authentication process is performed, and
the blank sheet condition changing portion changes the blank sheet condition for each user, according to a result of correction of the page classification information for the user.

4. An image forming apparatus comprising
the image reading device according to claim 3, wherein
an image of the non-blank page in the secondary image data file obtained by the image reading device is formed on a sheet material.

5. An image reading device comprising:
an image scanning portion including an image sensor configured to receive reflection light of light irradiated on a document sheet, the image scanning portion configured to read an image of the document sheet by the image sensor;

a page classification portion, operatively coupled to the image scanning portion and a processor of a computing device, configured to perform a page classification process of classifying a plurality of pieces of page image data obtained by the image scanning portion into data of a blank page that satisfies a predetermined blank sheet condition, and data of a non-blank page other than the data of the blank page;

a primary file generation portion, operatively coupled to the processor of the computing device, configured to generate a primary image data file that includes: the data of the non-blank page; the data of the blank page; and page classification information, and store the primary image data file in a non-transitory computer-readable data storage portion;

a preview output portion, operatively coupled to the processor of the computing device, configured to display, on a display portion, an image of the non-blank page and an image of the blank page in the primary image data file so as to separate the image of the non-blank page and the image of the blank page from each other;

a page classification correction portion, operatively coupled to the processor of the computing device, configured to correct the page classification information in the primary image data file according to a predetermined correction operation;

a file replacement portion, operatively coupled to the processor of the computing device, configured to replace the primary image data file stored in the data storage portion, with a secondary image data file that includes the data of the non-blank page and does not include the data of the blank page, when a predetermined determination condition is satisfied; and an expiration determination portion, operatively coupled to the processor of the computing device, configured to determine whether or not the primary image data file stored in the data storage portion is a file that has expired, the file that has expired being a file in which a date and time represented by information on date and time of generation or information on date and time of correction which are included in the primary image data file, is previous to a point of time before a predetermined grace period, wherein the file replacement portion also replaces, with the secondary image data file, the primary image data file having been determined as the file that has expired.

6. An image forming apparatus comprising
the image reading device according to claim 5, wherein
an image of the non-blank page in the secondary image data file obtained by the image reading device is formed on a sheet material.

* * * * *